United States Patent Office 2,981,711
Patented Apr. 25, 1961

2,981,711
HARDENABLE MIXTURES OF POLYGLYCIDYL ETHERS

Ferdinand Meyer, Mannheim, Kurt Demmler, Heidelberg, and Oskar Lissner, Mannheim, Germany, assignors to Badische Anilin- & Soda-Fabrik Aktiengesellschaft, Ludwigshafen (Rhine), Germany No Drawing. Filed Aug. 31, 1955, Ser. No. 534,384

Claims priority, application Germany Sept. 2, 1954

9 Claims. (Cl. 260—31.2)

This invention relates to hardenable mixtures of polyglycidyl ethers and to a process for the production of coatings and moldings from these mixtures.

It is known that polyglycidyl ethers which have an average number of epoxy groups per molecule greater than one, as, for example, polyglycidyl ethers from polyhydric phenols or alcohols and epichlorhydrin, can be hardened with aliphatic amines or polyamines. With these compounds alkali-proof coatings of the air drying type can be produced even on metallic supports which are sensitive to acid. The use of the aliphatic amines has the disadvantage, however, that the lacquer solutions harden too rapidly nad when dried are not free from opacity. They exhibit the so-called blooming effect and, moreover, are not sufficiently waterproof and hard.

We have now found that the said disadvantages can be overcome by hardening polyglycidyl ethers which have an average number of epoxy groups per molecule greater than one with a carbocyclic diamine containing two isolated carbocyclic radicals each having one amino group and each of said amino groups containing at least one hydrogen atom attached to the amino nitrogen.

These hardening agents can be illustrated by the general formula $$X_1HN-A-R-B-NHX_2$$

wherein A and B are identical or different isolated carbocyclic radicals, such as aromatic radicals, preferably phenyl radicals, or cycloaliphatic radicals, preferably hexyl radicals, and R stands for a single bond or a bivalent bridge group and $X_1$ and $X_2$ are hydrogen or identical or different aliphatic radicals preferably lower aliphatic radicals or cycloaliphatic radicals. Examples of a bivalent bridge group are short chain saturated aliphatic hydrocarbon radicals, such as methylene, ethylene, propylene and butylene radicals, oxygen, sulfur, —NH— and

"Isolated carbocyclic radicals" are meant to include carbocyclic radicals which are not condensed, but merely bonded by a single linkage or by a bivalent bridge group.

The amino groups can be present in ortho-, meta- or para-position to the bondage of the aromatic or cycloaliphatic radicals. As examples of aromatic diamines we may mention para.para'-diaminodiphenylmethane, para.para'-diaminodiphenylamine, para.para'-diaminodiphenylurea, para.para'-diaminodiphenylpropane, ortho. ortho'-diaminodiphenylmethane, para.para' - diaminodiphenyl sulfide, as well as their derivatives which are substituted in the cyclic radicals, for example by alkyl or alkoxy groups or halogen. One of the aromatic radicals can be hydrogenated. Examples of suitable cycloaliphatic diamines are dodecahydrobenzidine, diaminodicyclohexylmethane, diaminodicyclohexylpropane, diaminotricyclohexylmethane and diaminodicyclohexylamine, as well as their derivatives which are substituted in the cyclic radicals for example by alkyl or alkoxy groups or halogen. In these compounds also the amino groups may carry substituents and in consequence be secondary.

It is of special advantage to use about equivalent amounts of the epoxy compounds and the diamines, i.e. about one amino hydrogen atom to about each epoxy group.

For the production of molding and coating resins which are free from lacquer solvents those diamines which contain phenyl radicals are especially useful. When these compounds are used the polyglycidyl ethers from polyvalent alcohols especially can be hardened without the use of lacquer solvent, bright, waterproof and hard products being obtained. If no lacquer solvents are used the diamines are dissolved in the polyglycidyl ethers. The resultant solutions can be shelved for several hours without heating up in a marked degree and harden after about 12 hours at room temperature. Generally, the diamines are used in amounts that a hydrogen atom attached to nitrogen is present for each epoxy group of the glycidyl ether. The diamines may, however, also be used in any amount between 50 percent and 300 percent of the stoichiometrical amount i.e., amount needed to provide one hydrogen atom linked with nitrogen for each epoxy group. By suitable selection and if desired combination of primary or secondary diamines in which the amino groups are situated on two isolated aromatic or cycloaliphatic radicals, it is possible to improve simultaneously the pot-life of the lacquer solutions, their drying speed and the resistance of the coatings to light. In order to speed up the hardening process, the diamine containing two isolated carbocyclic radicals can be replaced with an amount up to 50 percent of the equivalent amount of another polyamine or amine, as, for example, dipropylene triamine or butylamine. It is also possible to react part of the epoxy groups with carboxylic acids, as, for example, with phthalic anhydride or with amines and to harden the resultant products while still liquid with the said diamines. In this way up to 50 percent of the epoxy groups can be reacted with carboxylic acids or with amines.

Both aromatic and aliphatic polyglycidyl ethers which have an average number of epoxy groups per molecule greater than one can be hardened with the diamines described. For example, the well known epoxy compounds from polyhydric phenols, such as 4.4'-dihydroxydiphenyldimethylmethane, and chlorhydrins, such as epichlorhydrin, can be used which are obtained in conventional manner by reacting these compounds with aqueous alkalies. Aliphatic polyglycidyl ethers are also suitable which have been obtained by known reactions, for example, from polyhydric alcohols, such as butanediol, butanetriol, hexanetriol, trimethylolpropane, pentaerythritol, or glycerine, and halogen hydrins, in particular epichlorhydrin, in the presence of acid catalysts and by subsequent splitting off of hydrogen halide from the halogen hydrin ethers thus formed. In many cases mixtures are of special advantage.

Applied to wood the solutions of the diamines in polyglycidyl ethers form very hard, clear films which are resistant to light, water, alkalies and organic solvents. The solutions can also be used for the production of moldings and for the stiffening of fabrics. If desired, fillers may be incorporated.

According to our invention the diamines can also be used for hardening polyglycidyl ethers which are dissolved in the conventional lacquer solvents. Examples of such lacquer solvents include ketones, such as acetone, esters, such as methyl acetate, ethyl acetate, butyl acetate or heptyl and nonyl acetate, alcohols, such as methanol, ethanol or butanol, glycol ethers, such as glycol methyl or ethyl ethers or glycol ether acetates, hydrocarbons and especially aromatic hydrocarbons which may be chlorinated. If convenient, the lacquer solvents may be used in admixture with each other.

It is often of advantage to add to the said lacquer solutions a few percent, with reference to the epoxy compound, of a fluxing agent. Suitable fluxing agents include urea-formaldehyde resins and phenol-formaldehyde resins, provided they are soluble in the said lacquer solvents; amines of high molecular weight and their salts, and quaternary ammonium compounds, such as the reaction products of a fatty acid ester of diethyl ethanol amine with dimethyl sulfate.

The lacquer solutions are eminently compatible with pigments, dyestuffs and fillers. Moreover, their pot-life is considerably longer than with the amines hitherto used. Nevertheless, the coatings dry very rapidly at room temperature and are eminently waterproof. The lacquer solutions, after the hardening agent has been added, can be shelved for some time or heated until a preliminary hardening has taken place, but this is not necessary to avoid the blooming effect. The drying of the lacquer solutions can be carried out at room temperature or at elevated temperature, as, for example, at 120° to 180° C. Even when immediately applied to substrata, clear films free from turbidity are obtained. The coatings are also noticeably bright, lustrous and elastic.

The following examples will further illustrate this invention but the invention is not restricted to these examples. The parts are by weight.

*Example 1*

32.5 parts of para.para'-diaminodiphenylmethane are added to 100 parts of a polyglycidyl ether obtained from butane triol and epichlorhydrin and having the epoxy number 0.65 (the epoxy number represents the number of gram-mols of epoxy groups contained in 100 grams of the polyglycidyl ether). The resultant solution is capable of being worked for several hours. When applied to wood it yields extremely hard, clear films. In conjunction with glass fabric, shaped articles of great strength can be made by conventional methods.

When only 16 parts of para.para'-diaminodiphenylmethane are used, plastic products which are insoluble in solvents are obtained, whereas by adding 65 parts of para.para'-diaminodiphenpylmethane very hard and clear castings are obtained.

By using the same amount of para-aminocyclohexyl-para-aminophenylmethane instead of the para.para'-diaminodiphenylmethane, the hardening time is shortened to about half while the properties of the product remain the same.

If about 10% of the para.para'-diaminodiphenylmethane are replaced by the equivalent amount of dipropylene triamine, the hardening time is shortened by about 5 hours.

*Example 2*

27.5 parts of para.para'-diaminodiphenylmethane and 2.5 parts of dipropylene triamine are added to 100 parts of the polyglycidyl ether used in Example 1. The product hardens more rapidly than the solution obtained according to Example 1.

*Example 3*

300 parts of the polyglycidyl ether used in Example 1 are heated for about 2 hours at 120° C. with 46.6 parts of phthalic anhydride. The pale yellow liquid has the acid number 0.6 and the epoxy number 0.41. 5.5 parts of para.para'-diaminodiphenylmethane are dissoloved in 30 parts of the said liquid. This solution hardens in a mold after a few hours to a clear, pale yellow, very hard casting.

*Example 4*

To 100 parts of a 40 percent solution of an epoxy resin from 1 mol of 4.4'-dihydroxydiphenylpropane and 2 mols of epichlorhydrin and having the epoxy value 0.20 (the epoxy value is the number of gram-mols of epoxy groups in 100 grams of the epoxy resin) in a mixture of equal parts of butyl acetate, ethylene glycolmonoethyl ether and toluene, which also contains 1.5 percent of a nonplasticized urea-formaldehyde resin, there is added 10%, with reference to the epoxy resin, of diaminodiphenylmethane which is dissolved in ethylene glycol monoethyl ether in the ratio 2:3, and after being stirred the product is applied immediately to glass. After drying for about 1 to 1½ hours at 20° C., a non-sticky coating is obtained with a clear surface free from turbidity which after thorough drying is very waterproof and stable to chemical reagents. If the lacquer solution is stored for 24 hours before use, a coating is obtained which dries considerably more rapidly and has a greater filling power; this is non-sticky after ¾ hour and is completely dry after about 3 hours. The solution can be used without trouble at any time within 2 weeks provided the temperature does not appreciably exceed 20° C.

In contrast, a lacquer solution of the same composition but which contains 2.4 percent of diethylene triamine instead of diaminodiphenylmethane, is stable for only 26 hours at 20° C. The coatings in this case are still not free from stickiness after 2½ hours and require more than 6 hours for thorough drying. They exhibit a strong turbidity at the surface and remain extremely sensitive to water even after long drying out.

*Example 5*

40 parts of an epoxy resin from 1 mol of 4.4'-dihydroxydiphenylpropane and 2 mols of epichlorhydrin and having a molecular weight of about 100 and a softening point of 81° C. according to Krämer-Sarnow-Nagel and containing about 2 epoxy groups in the molecule are dissolved in 60 parts of a mixture of methyl isobutyl ketone, ethylene glycol monoethylether and xylene in the ratio 1:1:1. 1.2 parts of a non-plasticized urea-formaldehyde resin can be added to the resin solution to improve the flow. Then 8.8 parts of a 50 percent solution of 4.4'-diaminodicyclohexylmethane in ethylene glycol monoethyl ether are added while stirring. If the lacquer solution is immediately applied to metal, glass, wood or other substrate, coatings are obtained which become non-sticky within an hour at room temperature and dry to elastic lacquers which are completely clear and without any turbidity. If the lacquer solution is stored overnight before use, a non-sticky film is obtained after 25 minutes and this has completely dried out after about 2 hours. The coatings obtained remain clear and unchanged even after storage in water for days. They have little sensitivity to temperature stresses. If the same lacquer solution is used but containing the equivalent amount of ethylene diamine instead of 4.4'-diaminodicyclohexylmethane, the coating is still not free from stickiness after 3 hours. In the dried condition it is strongly dulled and extremely sensitive to water. Whereas the epoxy resin solution containing 4 percent of ethylene diamine has gelled even after 2 days, the same lacquer solution with 11 percent of diaminodicyclohexylmethane as hardening agent can still be worked without trouble after storage for 5 days at 20° C.

*Example 6*

100 parts of a liquid epoxy resin having a molecular weight of about 320 and an epoxy value of 0.67 prepared from 1 mol of butane triol and 3 mols of epichlorhydrin are stirred well with 102 parts of a 35 percent solution of dodecahydrobenzidine in a mixture of 1 part of methyl isobutyl ketone, 1 part of ethylene glycol monoethyl ether, 1 part of toluene and 3 parts of methanol. After about 2 hours, the viscosity has increased. The lacquer solution is then applied to wood. A highly glossy pale coating of high filling power is obtained which is stable to water and alkalies. If the dodecahydrobenzidine be replaced by an equivalent amount of ethylene diamine or diethylene triamine in an about 35 percent solution, so violent a reaction takes place immediately after the addition of the diamine or triamine that the product decomposes with a brown coloration.

*Example 7*

100 parts of an epoxy resin with the epoxy value 0.20 prepared from 1 mol of 4.4'-dihydroxydiphenylpropane and 2 mols of epichlorhydrin are dissolved in 100 parts of a mixture of equal parts of methyl isobutyl ketone, ethylene glycol monoethyl ether and xylene and triturated on rollers with 50 parts of titanium dioxide. After adding 30 parts of a 35 percent solution of dodecahydrobenzidine in a mixture of 3 parts of methanol, 1 part of methyl isobutyl ketone and 5 parts of a 60 percent solution of a non-plasticized urea-formaldehyde resin in butanol, and diluting with acetone, the lacquer solution is applied to sheet metal. The coating dries to a non-sticky condition within 1 hour at room temperature and dries overnight to a nail-hard coating. It is extremely elastic even after drying for an hour at 120° to 180° C. and is stable to light and weather. The lacquer solution can still be used without trouble after storage for 4 days at 20° C.

*Example 8*

100 parts of butanetriol triglycidyl ether (epoxy value=0.67) are mixed with 27 parts of 4.4'-diaminodiphenylamine and the mixture is heated until a clear solution results. After 24 hours the liquid mass has hardened to form a clear and very hard product of a violet coloration.

Products having similar properties are obtained if 33.5 parts, instead of 27 parts, of 4.4'-diaminodiphenylamine are used.

*Example 9*

36 parts of 4,4'-diaminodiphenyl sulfide are dissolved in 100 parts of butanetriol triglycidyl ether (epoxy value=0.67). After a few days clear violet moldings of very great hardness are obtained.

*Example 10*

100 parts of butanetriol triglycidyl ether (epoxy value=0.67) are mixed with 40.5 parts of 4.4'-diaminodiphenyl urea. After a few days hard moldings having a violet coloration are obtained.

*Example 11*

A solution of 100 parts of butanetriol triglycidyl ether (epoxy value 0.67) and 35 parts of 2.2'-diamino-diphenyldimethylmethane hardens after 1–2 days giving a clear hard product.

*Example 12*

38 parts of 4.4'-diamino-3.3'-dimethyl-diphenyl-methane are dissolved in 100 parts of butanetriol triglycidyl ether (epoxy value=0.67). The solution hardens within a few days giving a clear hard mass.

*Example 13*

21 parts of p.p'-diaminodiphenylmethane are dissolved in 100 parts of butanetriol triglycidyl ether (epoxy value 0.42) which has been precondensed with one third of its equivalent amount of phthalic anhydride. The solution hardens after some 24 hours.

We claim:

1. A hardenable lacquer and molding mixture comprising (a) a polyglycidyl ether of a compound selected from the class consisting of polyhydric alcohols and polyhydric phenols and (b) as a hardening agent a diamine of the general formula $$NH_2-A-R_{(n-1)}-B-NH_2$$

in which A and B are divalent cyclohexane rings, R is a bivalent radical selected from the group consisting of methylene, ethylene, propylene, butylene, —O—, —S—, —NH— and —NH—CO—NH, and $n$ is an integer from 1 to 2, the diamine being present in the hardenable mixture in an amount between 50 percent and 300 percent of the amount needed to furnish one hydrogen atom linked with nitrogen for each epoxy group.

2. A mixture in accordance with claim 1 wherein R is methylene.

3. A mixture in accordance with claim 1 wherein R is oxygen.

4. A mixture in accordance with claim 1 wherein R is a sulphur.

5. A mixture in accordance with claim 1 wherein R is —NH—.

6. A mixture in accordance with claim 1 wherein R is —NH.CO.NH—.

7. A mixture in accordance with 1, including a lacquer solvent.

8. A mixture in accordance with claim 1, including a lacquer solvent and a small amount of a member of the group consisting of urea-formaldehyde and phenol-formaldehyde resins.

9. A mixture in accordance with claim 1 wherein the amount of diamine present in the hardenable mixture is equivalent to the amount needed to provide one hydrogen atom linked with nitrogen for each epoxy group of the polyglycidyl ether.

References Cited in the file of this patent

UNITED STATES PATENTS

| | | |
|---|---|---|
| 2,510,885 | Greenlee | June 6, 1950 |
| 2,712,535 | Fisch | July 5, 1955 |
| 2,717,885 | Greenlee | Sept. 13, 1955 |
| 2,773,048 | Formo | Dec. 4, 1956 |
| 2,801,989 | Farnham | Aug. 6, 1957 |